United States Patent
Huang et al.

(10) Patent No.: US 11,960,253 B2
(45) Date of Patent: Apr. 16, 2024

(54) SYSTEM AND METHOD FOR PARAMETER OPTIMIZATION WITH ADAPTIVE SEARCH SPACE AND USER INTERFACE USING THE SAME

(71) Applicant: INDUSTRIAL TECHNOLOGY RESEARCH INSTITUTE, Hsinchu (TW)

(72) Inventors: Po-Yu Huang, Zhudong Township (TW); Chun-Fang Chen, Hukou Township (TW); Hong-Chi Ku, Xihu Township (TW); Te-Ming Chen, Taipei (TW); Chien-Liang Lai, Xinfeng Township (TW); Sen-Chia Chang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 629 days.

(21) Appl. No.: 17/135,349

(22) Filed: Dec. 28, 2020

(65) Prior Publication Data

US 2022/0171349 A1    Jun. 2, 2022

(30) Foreign Application Priority Data

Nov. 30, 2020 (TW) ................................ 109142024

(51) Int. Cl.
G05B 13/04    (2006.01)
G06N 7/00    (2023.01)
G06N 7/01    (2023.01)

(52) U.S. Cl.
CPC ............. *G05B 13/042* (2013.01); *G06N 7/01* (2023.01)

(58) Field of Classification Search
CPC ...... G05B 13/042; G05B 13/024; G06N 7/01; G06N 5/01; G06N 20/10; G06Q 10/04; G06F 16/9535
See application file for complete search history.

(56) References Cited

U.S. PATENT DOCUMENTS 7,493,185 B2    2/2009    Cheng et al.
10,590,494 B2    3/2020    Gershater et al.
(Continued)

FOREIGN PATENT DOCUMENTS

CN    108093085 A    5/2018
CN    109870903 A    6/2019
(Continued)

OTHER PUBLICATIONS

Taiwanese Office Action and Search Report for Taiwanese Application No. 109142024, dated Nov. 12, 2021.
(Continued)

*Primary Examiner* — Charles R Kasenge
(74) *Attorney, Agent, or Firm* — Birch, Stewart, Kolasch & Birch, LLP (57) ABSTRACT

A system and a method for parameter optimization with adaptive search space and a user interface using the same are provided. The system includes a data acquisition unit, an adaptive adjustment unit and an optimization search unit. The data acquisition unit obtains a set of executed values of several operating parameters and a target parameter. The adaptive adjustment unit includes a parameter space transformer and a search range definer. The parameter space transformer performs a space transformation on a parameter space of the operating parameters according to the executed values. The search range definer defines a parameter search range in a transformed parameter space based on the sets of the executed values. The optimization search unit takes the parameter search range as a limiting condition and takes (Continued)

optimizing the target parameter as a target to search for a set of recommended values of the operating parameters.

18 Claims, 8 Drawing Sheets

(56) References Cited

U.S. PATENT DOCUMENTS

| | | | |
|---|---|---|---|
| 2014/0222376 A1 | 8/2014 | Kao et al. | |
| 2015/0081222 A1* | 3/2015 | Laing | G06N 20/00 702/9 |
| 2017/0096889 A1* | 4/2017 | Blanckaert | E21B 44/00 |
| 2019/0171776 A1 | 6/2019 | Huang et al. | |
| 2020/0126167 A1 | 4/2020 | Meerkov et al. | |
| 2021/0017847 A1* | 1/2021 | Aragall | G06F 30/28 |

FOREIGN PATENT DOCUMENTS

| | | |
|---|---|---|
| CN | 111863645 A | 10/2020 |
| TW | 201019137 A | 5/2010 |
| TW | 201432479 A | 8/2014 |
| TW | I519986 B | 2/2016 |
| TW | 201921271 A | 6/2019 |
| TW | 202016869 A | 5/2020 |
| WO | WO 2020/179627 A1 | 9/2020 |

OTHER PUBLICATIONS

Nguyen et al., "Filtering Bayesian Optimization Approach in Weakly Specified Search Space," Knowledge and Information Systems, vol. 60, 2019 (Published online Jul. 10, 2018), pp. 385-413 (total 30 pages).

Raponi et al., "High Dimensional Bayesian Optimization Assisted by Principal Component Analysis," arXiv:2007.00925v1 [cs.NE], Jul. 2, 2020, pp. 1-11 (total 12 pages).

Extended European Search Report for European Application No. 21158053.5, dated Aug. 12, 2021.

Nguyen et al., "Bayesian Optimization in Weakly Specified Search Space," 2017 IEEE International Conference on Data Mining, IEEE, Nov. 18, 2017, pp. 347-356.

Yang et al., "On hyperparameter optimization of machine learning algorithms: Theory and practice," Neurocomputing, vol. 415, 2020 (Published online Jul. 25, 2020), pp. 295-316.

Japanese Office Action for Japanese Application No. 2021-015175, dated Jun. 7, 2022, with English translation.

* cited by examiner

SYSTEM AND METHOD FOR PARAMETER OPTIMIZATION WITH ADAPTIVE SEARCH SPACE AND USER INTERFACE USING THE SAME

This application claims the benefit of Taiwan application Serial No. 109142024, filed Nov. 30, 2020, the disclosure of which is incorporated by reference herein in its entirety.

TECHNICAL FIELD

The disclosure relates in general to a system and a method for parameter optimization with adaptive search space and a user interface using the same.

BACKGROUND

In the industry, it is necessary to search for a set of recommended values of the operating parameters to optimize a target parameter. Due to the high interaction effect of the operating parameters, it is not easy to define an effective parameter search range. If the defined parameter search range is too narrow, it may converge to a non-optimal local solution. If the defined parameter search range is too wide, the number of trials must be quite large to be able to converge to the optimal solution. Many industries have few process equipment and very expensive materials. If the number of trials is too many, it will not only affect the delivery time of the product, but also cause a lot of cost waste.

Therefore, in the case of operating parameters with a high interaction effect, researchers are actively studying how to define an effective parameter search range to accelerate the speed of parameter optimization.

SUMMARY

The disclosure is directed to a system and a method for parameter optimization with adaptive search space and a user interface using the same.

According to one embodiment, a system for parameter optimization with adaptive search space is provided. The system includes a data acquisition unit, an adaptive adjustment unit and an optimization search unit. The adaptive adjustment unit includes a parameter space transformer and a search range definer. The data acquisition unit is configured to obtain a plurality sets of executed values of a plurality of operating parameters and a target parameter. The parameter space transformer is configured to perform a space transformation on a parameter space of the operating parameters according to the plurality sets of the executed values. The search range definer is configured to define a parameter search range in a transformed parameter space according to the plurality sets of the executed values. The optimization search unit is configured to search out a set of recommended values of the operating parameters by taking the parameter search range as a limiting condition and taking optimizing the target parameter as a target.

According to another embodiment, a method for parameter optimization with adaptive search space is provided. The method includes the following steps. A plurality sets of executed values of a plurality of operating parameters and a target parameter are obtained. A space transformation is performed on a parameter space of the operating parameters according to the plurality sets of the executed values. A parameter search range in a transformed parameter space is defined according to the plurality sets of the executed values. A set of recommended values of the operating parameters is searched out by taking the parameter search range as a limiting condition and taking optimizing the target parameter as a target.

According to an alternative embodiment, a user interface is provided. The user interface includes a filtering window, a parameter search range window and a recommended value window. The classifying window is configured to show a plurality of groups of the a plurality of operating parameters. The filtering window is configured to show a result of filtering the operating parameters. The parameter search range window is configured to show a parameter search range. The recommended value window is configured to show a set of recommended values of the operating parameters.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
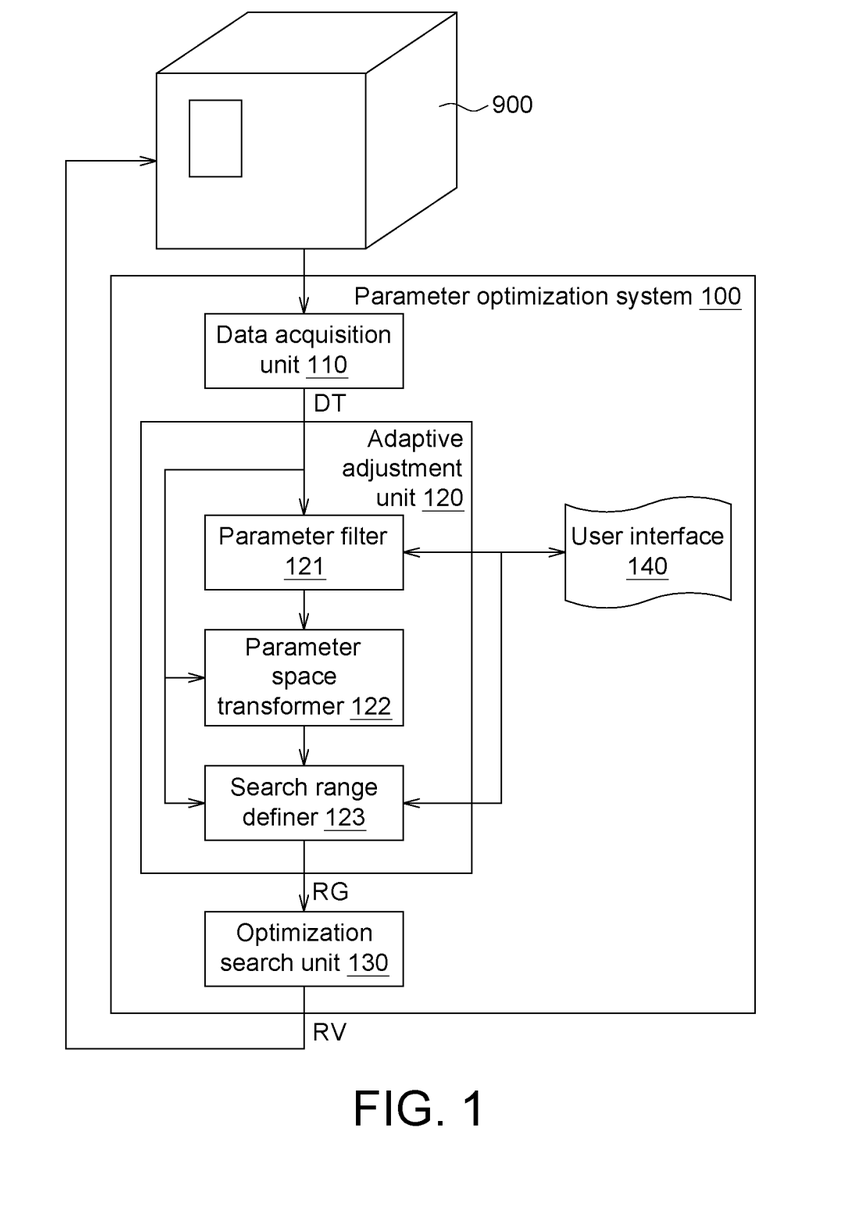
FIG. 1 shows a block diagram of a parameter optimization system with adaptive search space.
Figure 2:
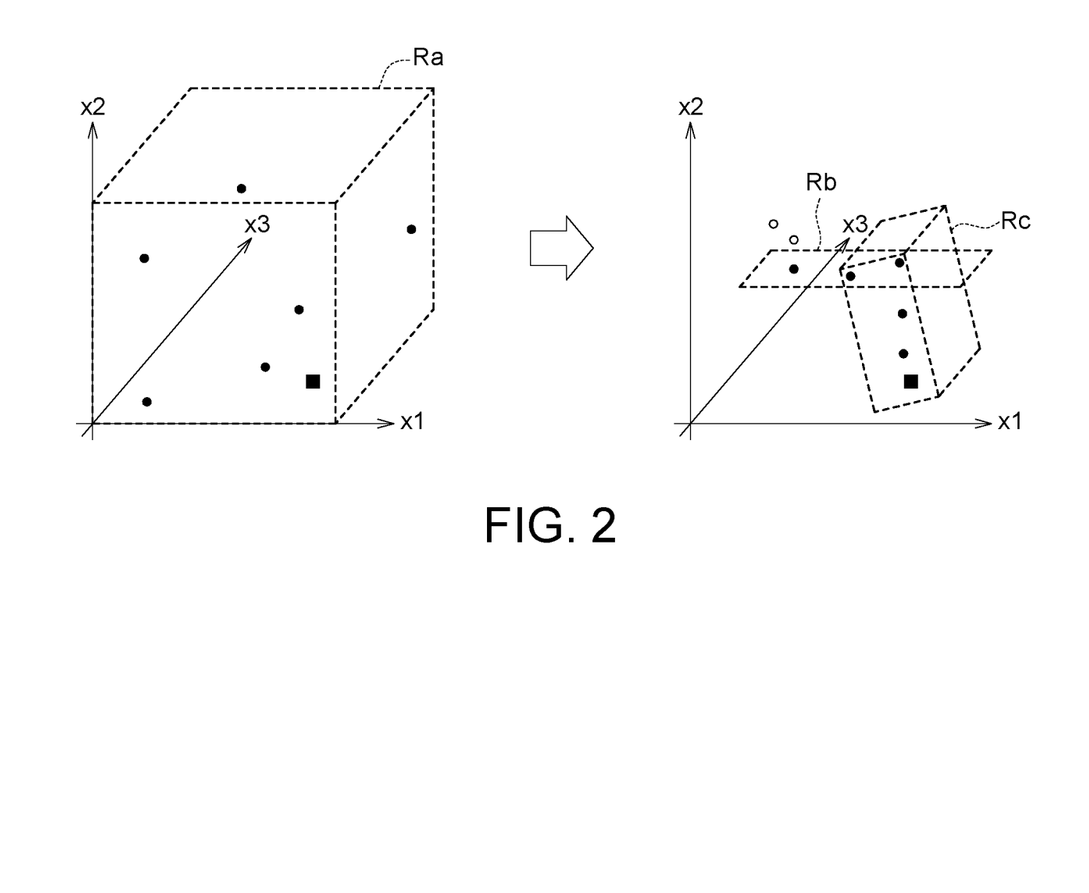
FIG. 2 shows examples of different parameter search ranges.

Refer please to FIG. 1, which show a block diagram of a parameter optimization system 100 with adaptive search space. The parameter optimization system 100 includes a data acquisition unit 110, an adaptive adjustment unit 120, an optimization search unit 130 and a user interface 140. The adaptive adjustment unit 120 includes a parameter filter 121, a parameter space transformer 122 and a search range definer 123. The data acquisition unit 110, the adaptive adjustment unit 120, the parameter filter 121, the parameter space transformer 122, the search range definer 123 and/or the optimization search unit 130 are/is, for example, a circuit, a chip, a circuit board or a storage device storing program code. The user interface 140 is, for example, a display screen, an input/output device or a smart phone. The parameter optimization system 100 is used to optimize several operating parameters, such as pressure, temperature and flow, for the process equipment 900 (or production line) in order to optimize the target parameter, such as yield. In the optimization process, the parameter space transformer 122 of the adaptive adjustment unit 120 performs the parameter space transformation, and the search range definer 123 of the adaptive adjustment unit 120 defines a suitable parameter search range to improve the efficiency of the optimization process. Please refer to FIG. 2, which shows examples of different parameter search ranges Ra, Rb, Rc. As shown on the left side of FIG. 2, the traditional parameter search range Ra is fixed to the entire range, and it takes a considerable number of trials to converge to the optimal solution (square point). As shown on the right side of FIG. 2, in this embodiment, during iteration, the parameter search range is dynamically adjusted (for example, the parameter search range Rb is adjusted to the parameter search range Rc after multiple iterations), and it can rapidly converge to the optimal solution (square point) without too many trials. The following is a flowchart to explain the operation of each component in detail.

Figure 3:
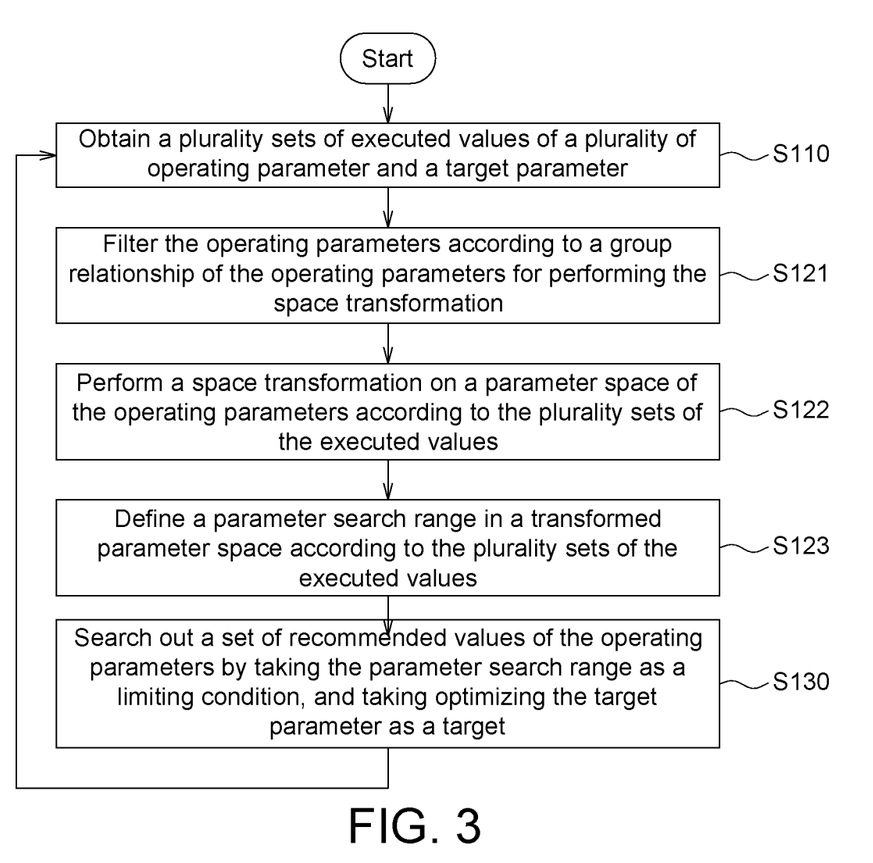
FIG. 3 shows a flowchart of a parameter optimization method with adaptive search space according to an embodiment.

Please refer to FIG. 3, which shows a flowchart of a parameter optimization method with adaptive search space according to an embodiment. In step S110, the data acquisition unit 110 obtains a plurality of sets of executed values of a plurality of operating parameters and a target parameter. For example, refer please to FIG. 4, which shows a schematic diagram of step S110 according to an embodiment. The process equipment 900 has, for example, three operating parameters x1, x2, x3 and one target parameter y. For example, the operating parameter x1 is flow, the operating parameter x2 is temperature, and the operating parameter x3 is pressure. The target parameter y is, for example, yield. The number of the operating parameters is not limited to 3, the number of operating parameters can be 2 or more than 3. The subsequent steps are described by taking the operating parameters x1, x2, x3 and the target parameter y as examples, but it must be emphasized that this embodiment does not limit the number of the operating parameters. Several sets of the executed values DT of the operating parameters x1, x2, x3 and the target parameter y (shown in FIG. 1) is shown in Table 1 for example. The number of the sets of the executed values is not limited to 3, as long as the executed values that have been trialed in the iteration process will be included, and will continue to increase, so that the subsequent optimization process can move towards the optimal solution.

TABLE 1

Figure 4:
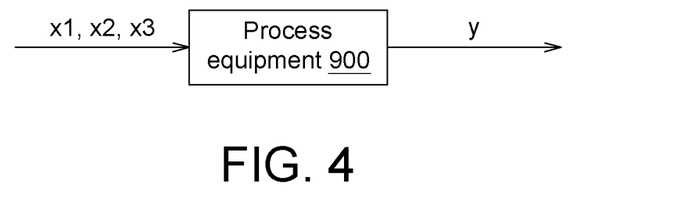
FIG. 4 shows a schematic diagram of step S110 according to an embodiment.

| operating parameter x1 | operating parameter x2 | operating parameter x3 | target parameter y |
|---|---|---|---|
| 0.0085 | 2.1414 | 1.1703 | 6.0313 |
| 0.0573 | 0.2412 | 1.0046 | 3.0650 |
| 0.8442 | 1.2180 | 0.3925 | 4.1018 |

Figure 5:
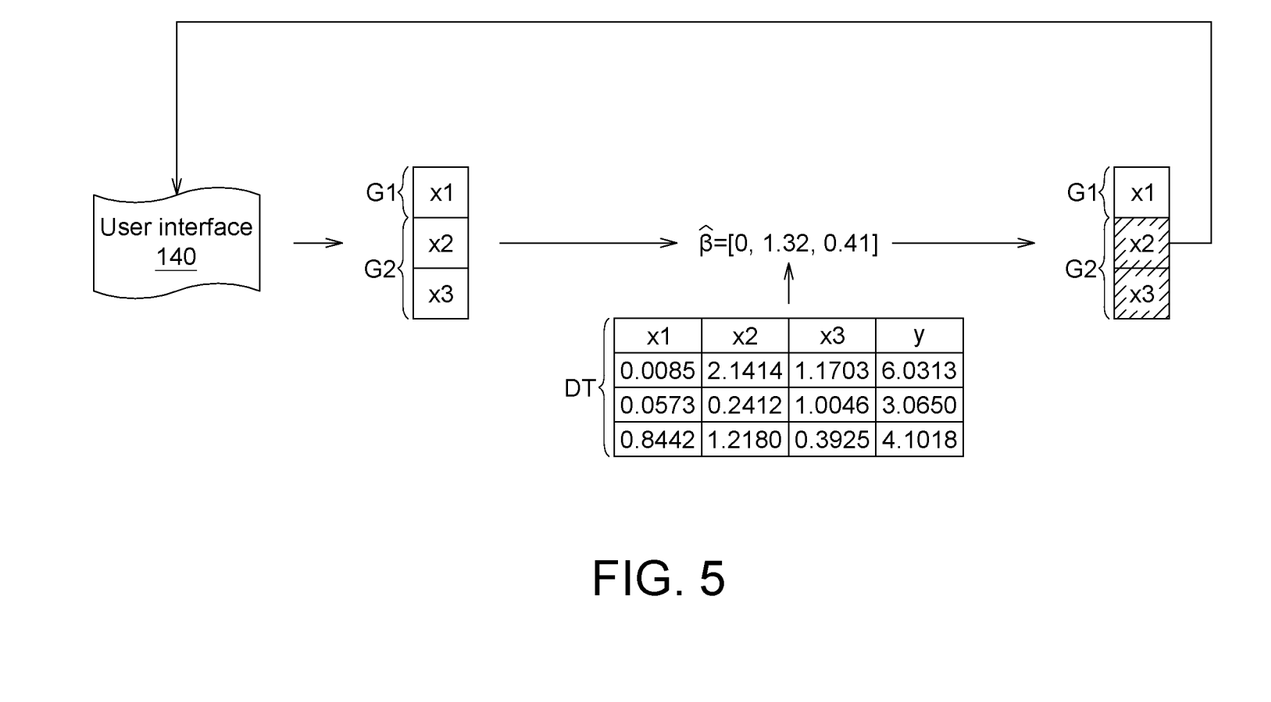
FIG. 5 illustrates the schematic diagram of step S121.

Next, in step S121, the parameter filter 121 of the adaptive adjustment unit 120 filters the operating parameters x1, x2, x3 according to a group relationship of the operating parameters x1, x2, 3. Please refer to FIG. 5, which illustrates the schematic diagram of step S121. In this step, users can use the user interface 140 to classify the operating parameters x1, x2, x3 into groups G1, G2 according to the interaction effect of the operating parameters x1, x2, x3 (the number of groups is not limited to 2). For example, the operating parameters x2 and x3 have a higher interaction effect and are classified into the same group G2. The operating parameter x1 has a lower interaction effect with the operating parameters x2, x3, and is classified into another group G1. Then, the parameter filter 121 filters the groups G1, G2 according to the correlations of the groups G1, G2 to the target parameter y. For example, the parameter filter 121 uses a Group-Lasso Regularization algorithm to calculate the $\hat{\beta}$ values of the operating parameters x1, x2, and x3 of the groups G1 and G2 to be 0, 1.32, and 0.41, respectively. The greater the absolute value of $\hat{\beta}$ is greater than 0, the higher the correlation to the target parameter y. Therefore, the parameter filter 121 can select the operating parameters x2, x3 of the group G2 as the main adjustment objects in the parameter search range.

In addition to the group lasso regression algorithm, the parameter filter 121 can also use a Sparse Group Lasso algorithm, a Bayesian Group Lasso algorithm, a Composite Absolute Penalty algorithm or a Group Least Angle Regression Selection algorithm to filter these operating parameters x1, x2, x3.

In addition, the number of the operating parameters in each group is not limited to 1 or 2 (may be greater than or equal to 3). Moreover, the number of operating parameters in each group does not need to be the same.

In this step, the operating parameters x1, x2, and x3 are classified according to the interaction effect, so that the operating parameters x2 and x3 that are easy to influence each other can be considered together, and the interaction effect of the operating parameters x2, x3 can be reduced through subsequent space transformation. In addition, the groups G1 and G2 are filtered according to the correlations to the target parameter y, so as to leave the group G2 that has the most correlation to the target parameter y, so that the optimization process can converge more quickly.

Figure 6:
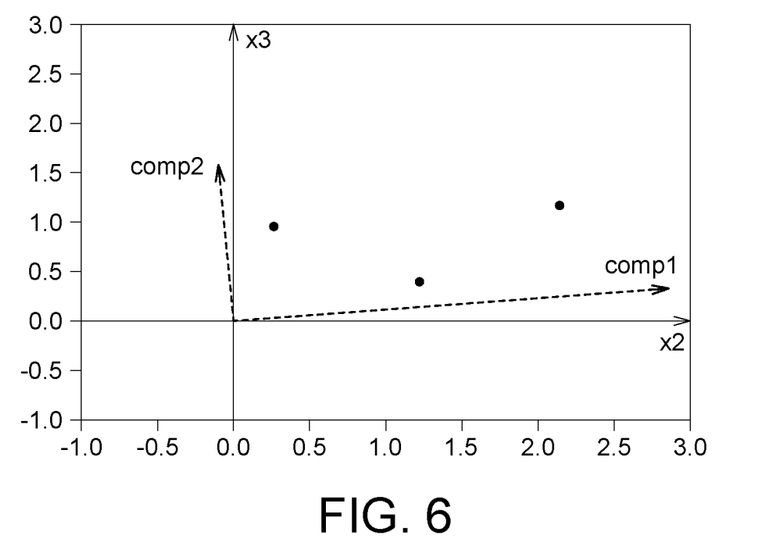
FIG. 6 illustrates the schematic diagram of step S122.

Afterwards, in step S122, the parameter space transformer 122 performs a space transformation on a parameter space of the operating parameters x2, x3 according to the sets of the executed values DT (shown in FIG. 1). Please refer to FIG. 6, which illustrates the schematic diagram of step S122. For example, the solid line coordinate axis in FIG. 6 is the operating parameters x2, x3 of the original parameter space. The dotted line coordinate axis in FIG. 6 is the transformed components comp1, comp2 of a transformed parameter space. The parameter space transformer 122 performs the space transformation via, for example, a Partial Least Squares regression algorithm. In the partial least squares regression algorithm, as shown in the following formula (1), X is the matrix that records the operating parameters x2, x3, S is the matrix that records the transformed components comp1 and comp2, and w is the transformation matrix.

$$S = Xw \quad (1)$$

$$S = \begin{bmatrix} comp1 \\ comp2 \end{bmatrix}, X = [x2, x3].$$

In the partial least squares regression algorithm, it is mainly required to obtain w, so that the transformed component comp1 and the transformed component comp2 have the greatest correlation to the target parameter y, that is, the following formula (2).

$$\max_w\{[\text{cov}(Xw,y)]^2\} = \max_w\{\text{var}(Xw)[\text{corr}(Xw,y)]^2 \text{var}(y)\} \quad (2)$$

There is an orthogonal relationship between the transformed component comp1 and the transformed component comp2, which can reduce the interaction effect of parameters. The transformed component comp1 and transformed component comp2 can maintain the variation of the original operating parameters x2, x3, and can also improve the recognition to the target parameter y.

The relationship between the transformed components comp1, comp2 and the operating parameters x2, x3 is as follows:

$$\begin{bmatrix} comp1 \\ comp2 \end{bmatrix} = [x2, x3] \begin{bmatrix} 0.987 & -0.159 \\ 0.159 & 0.987 \end{bmatrix} \quad (3)$$

$$w = \begin{bmatrix} 0.987 & -0.159 \\ 0.159 & 0.987 \end{bmatrix}.$$

The above formula (3) can also be expressed as the following formulas (4), (5).

$$comp1=0.987*x2+0.159*x3 \quad (4)$$

$$comp2=-0.159*x2+0.987*x3 \quad (5)$$

As shown in Tables 2 and 3 below, Table 2 is the operating parameters x2, x3. After space transformation, the transformed components comp1, comp2 of Table 3 can be obtained.

TABLE 2

| operating parameter x2 | operating parameter x3 |
|---|---|
| 2.1414 | 1.1703 |
| 0.2412 | 1.0046 |
| 1.2180 | 0.3925 |

TABLE 3

| transformed component comp1 | transformed component comp2 |
|---|---|
| 2.300 | 0.815 |
| 0.398 | 0.953 |
| 1.265 | 0.194 |

In addition to the above-mentioned partial least squares regression algorithm, the parameter space transformer 122 can also perform the space transformation via a Principal Component Analysis (PCA) algorithm.

Figure 7:
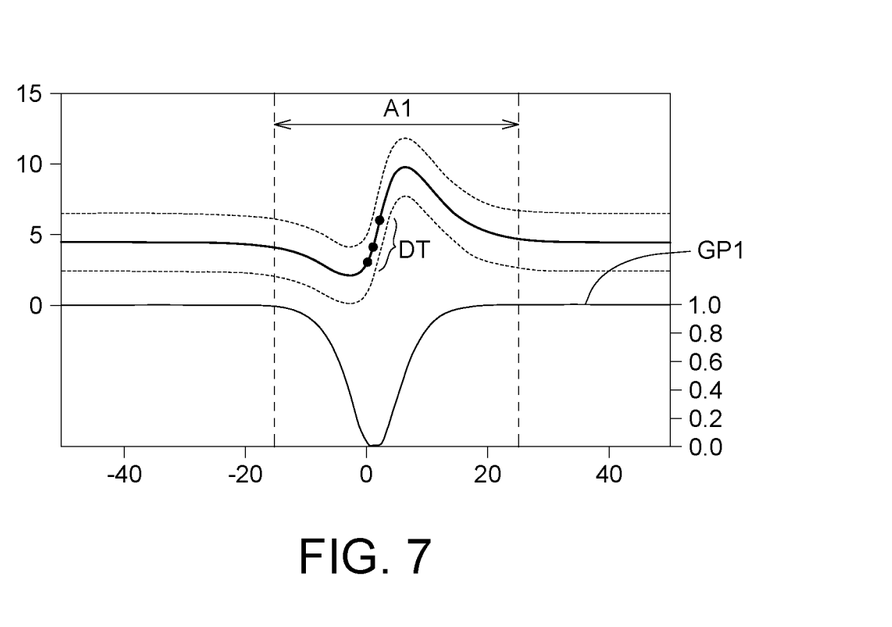
FIG. 7 shows a Gaussian process model of a transformed component according to an embodiment.

Then, in step S123, the search range definer 123 of the adaptive adjustment unit 120 defines a parameter search range RG (shown in FIG. 1) in the transformed parameter space according to the sets of the executed values DT (shown in FIG. 1). This step includes the following procedures. Please refer to FIG. 7, which shows a Gaussian process model GP1 of the transformed component comp1 according to an embodiment. As shown in FIG. 7, the search range definer 123 obtains the Gaussian process model GP1 of the transformed component comp1 according to the sets of the executed values DT. The Gaussian process model GP1 shows inaccuracy. The closer to the sets of the executed values DT, the lower the inaccuracy; the farther away from the sets of the executed values DT, the higher the inaccuracy.

Next, the search range definer 123 reserves an accurate range A1, such as −15 to 25, according the Gaussian process model GP1.

Figure 8:
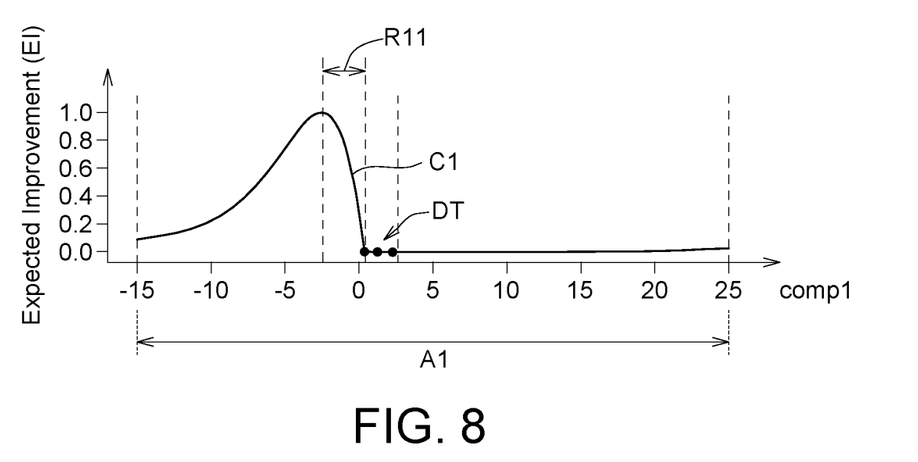
FIG. 8 shows an Expected Improvement (EI) function of the transformed component.

Then, refer please to FIG. 8, which shows the Expected Improvement (EI) function C1 of the transformed component comp1. In the EI function C1, the vertical axis is the Expected Improvement (EI), and the horizontal axis is the accurate range of the transformed component comp1 The search range definer 123 then defines the search range R11 in accurate range A1 based on the expected improvement value. As shown in FIG. 8, when the transformed component comp1 is in the range of 0.40 to 2.30 where the sets of the executed values DT are located, the expected improvement value is 0. When the transformed component comp1 is moved from 0.40 to −2.50, the expected improvement value can be greatly increased to 0.62. When the transformed component comp1 is moved from 2.3 to 25, the expected improvement value can only be slightly increased to 0.004. It can be seen that the transformed component comp1 can be moved in the negative direction to obtain a greater improvement. Therefore, the search range definer 123 can define the transformed component comp1 in the range of −2.50 to 0.40 as a search range R11, which is the following formula (6).

$$-2.50 \leq 0.987*x2+0.159*x3 \leq 0.40 \quad (6)$$

Figure 9:
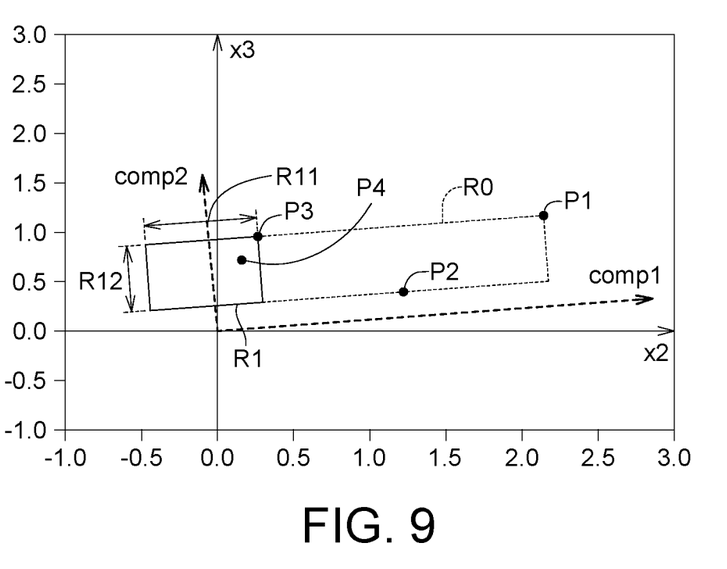
FIG. 9 shows an executed value range and a parameter search range according to an embodiment.

Similarly, in a similar manner, the search range definer 123 can define the transformed component comp2 in the interval from 0.19 to 0.95 as a search range R12 (shown in FIG. 9).

$$0.19 \leq -0.159*x2+0.987*x3 \leq 0.95 \quad (7)$$

Please refer to FIG. 9, which shows the executed value range R0 and the parameter search range R1 according to an embodiment. The sets of the executed values DT include a point P1, a point P2 and a point P3. The point P1, the point P2 and the point P3 are located in the executed value range R0. The search range definer 123 further defines the search range R11 in the transformed component comp1 based on the executed value range R0, and defines the search range R12 in the transformed component comp2 to form the parameter search range R1. The parameter search range R1 is the range where there is a considerable chance of convergence towards the optimal solution.

Afterwards, in step S130, the optimization search unit 130 takes the parameter search range R1 as a limiting condition and takes optimizing the target parameter y as a target to search for the a set of recommended value RV, such as the point P4 in FIG. 9, (the set of recommended value RV is shown in FIG. 1). For example, the optimization search unit 123 can search the set of the recommended values RV of the operating parameters x1, x2, x3 via the Constrained Bayesian optimization algorithm, as shown in the following equation (8).

$$\min_{x1,x2,x3} f(x1,x2,x3)-2.50 \leq 0.987*x2+0.159*x3 \leq 0.40 \quad (8)$$

subject to $$0.19 \leq -0.159*x2+0.987*x3 \leq 0.95$$

After obtaining the set of the recommended values RV of the operating parameters x1, x2, and x3, it can be provided to the process equipment 900 (or production line) to obtain the corresponding target parameter y. If the search for the optimal solution has not converged, add this set of values to the sets of executed values DT (shown in FIG. 1), and execute steps S110, S121, S122, S123, S130 again. In the process of executing again, the grouping results and filtering results of step S121 may be changed or the same. In steps S122 and S123, the operating parameters for performing the space transformation and defining the parameter search range may also be changed or unchanged.

Figure 10:
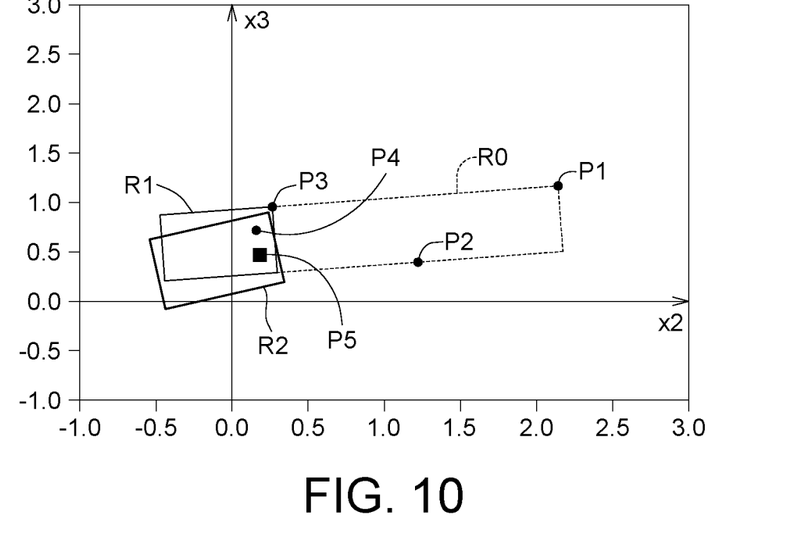
FIG. 10 shows two parameter search ranges obtained by executing the process twice.

Please refer to FIG. 10, which shows the parameter search range R1 and the parameter search range R2 obtained by executing the process twice. As shown in FIG. 10, the sets of the executed values DT at the beginning are the point P1, the point P2 and the point P3. The point P1, the point P2 and the point P3 are located in the executed value range R0. After the process is executed once, the parameter search range R1 is obtained, and the point P4 is recommended in the parameter search range R1. After the process is executed for the second time, the parameter search range R2 is obtained (the operating parameters x2, x3 are selected in the step S121), and the point P5 is recommended in the parameter search range R2. In the example in FIG. 10, in both of the first execution process and the second execution process, the operating parameters x2, x3 are selected, so the parameter search range R1 and the parameter search range R2 can be drawn on the same graph. If the operating parameters x2 and x3 are not selected in both of the first execution process and the second execution process, the parameter search range R1 and the parameter search range R2 cannot be plotted on the same graph.

In another embodiment, the above step S121 can be omitted, and all of the operating parameters x1, x2, x3 are used as adjustment objects of the parameter search range.

Figure 11:
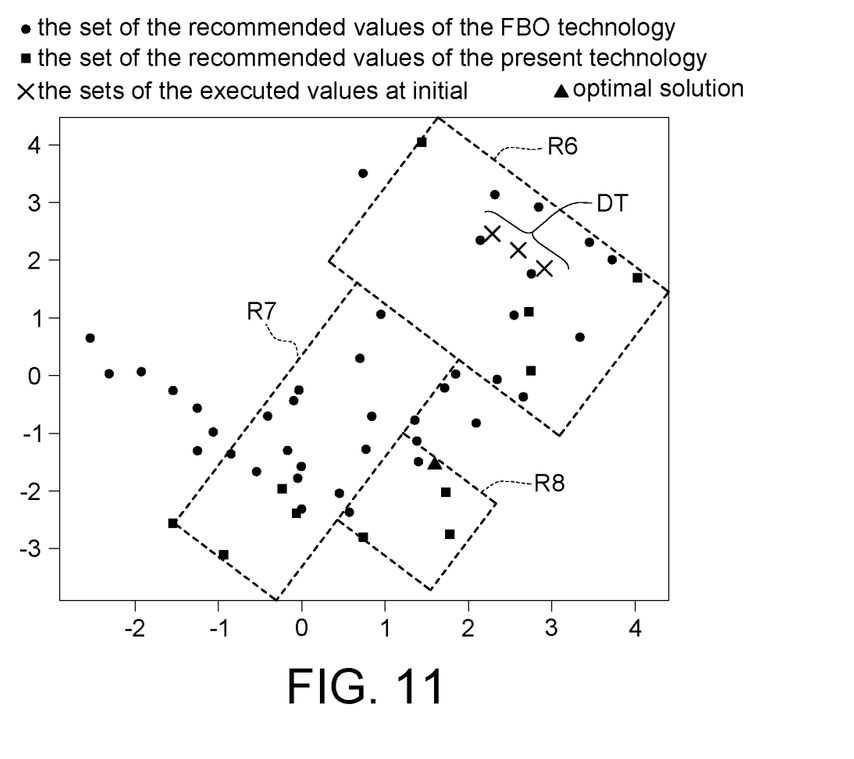
FIG. 11 illustrates the parameter optimization comparison based on the traditional Filtering Bayesian optimization (FBO) technology and the present technology.

Please refer to FIG. 11, which illustrates the parameter optimization comparison based on the traditional Filtering Bayesian optimization (FBO) technology and the present technology. The researchers initially executed the FBO technology and the present technology with the same sets of the executed values DT. From FIG. 11, it can be found that the set of the recommended values of the FBO technology during the optimization process is scattered everywhere, and it takes quite a few iterations to converge to the optimal solution. By executing the present technology, the parameter search range R6 is adjusted to the parameter search range R8 through the parameter search range R7, and the optimal solution is quickly searched.

The researchers compared the present technology with several other traditional technologies under the same experimental conditions, and sorted out the number of iterations that converged to the optimal solution as shown in Table 4. The first method is the traditional Bayesian optimization (BO) technology, the second method is the PCA-BO technology, the third method is FBO technology, the fourth method is the present technology in which the step S121 is omitted, and the fifth method is the present technology in which the step S121 is not omitted.

TABLE 4

|  | First method | Second method | Third method | Fourth method | Fifth method |
|---|---|---|---|---|---|
| experimental condition I | 59 trials | 79 trials | 43 trials | 27 trials | 16 trials |
| experimental condition II | 67 trials | >100 trials | 84 trials | 48 trials | 41 trials |

Obviously, regardless of the experimental conditions, the present technology can quickly converge to the optimal solution.

Figure 12:
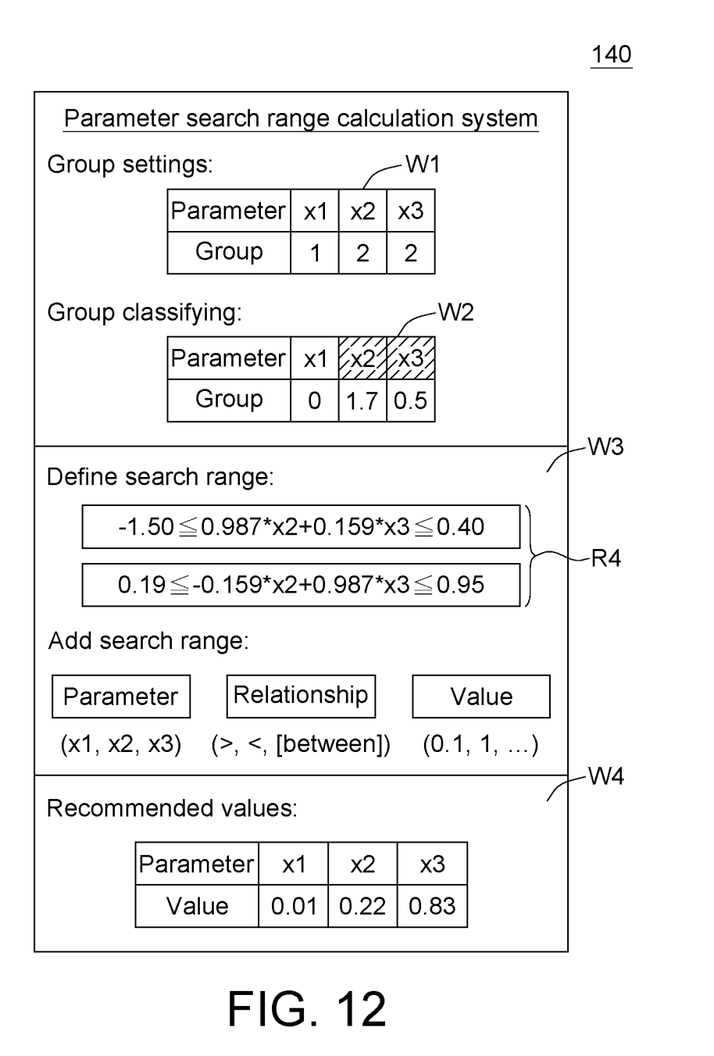
FIG. 12 shows an example of a user interface.

In the above process, the user can monitor the operation of the parameter optimization system 100 through the user interface 140. Please refer to FIG. 12, which shows an example of the user interface 140. The user interface 140 includes a classifying window W1, a filtering window W2, a parameter search range window W3 and a recommended value window W4. The classifying window W1 is configured to show the groups G1, G2 (shown in FIG. 5) of the operating parameters x1, x2, x3. As shown in FIG. 12, in the classifying window W1, "1" represents the group G1, and "2" represents the group G2. The filtering window W2 is configured to show a result of filtering the operating parameters x1, x2, x3. As shown in FIG. 12, the filtering window W2 shows that the $\hat{\beta}$ values of the operating parameters x1, x2, and x3 are 0, 1.7, and 0.5, respectively. If the absolute value of $\hat{\beta}$ is much higher than 0, the correlation to the target parameter y is high. Therefore, the operating parameters x2 and x3 of the group G2 can be selected as the main adjustment objects of the parameter search range. The parameter search range window W3 is configured to show the parameter search range R4. The parameter search range R4 is the range after executing the space transformation, not the original range of the operating parameters x2, x3. As shown in FIG. 12, the parameter search range R4 is a limited range of a linear combination of the operating parameters x2 and x3. Further, when the operating parameters x1, x2, and x3 are filtered, the parameter search range R4 displayed in the parameter search range window W3 only corresponds to the operating parameters x2, x3. The recommended value window W4 is used to display a set of recommended values of the operating parameters x1, x2, x3, such as "0.01, 0.22, 0.83."

Through the above embodiments, the parameter search range can be adjusted adaptively through the space transformation technology, and it can quickly converge to the optimal solution without too many trials. In addition, when there are too many operating parameters, some of the operating parameters are selected for performing the space transformation and defining the parameter search range, and the efficiency of parameter optimization can be improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for parameter optimization with adaptive search space, comprising a process equipment, a circuit connecting with the process equipment, and a storage device storing program code executed by the circuit to optimize a plurality of operating parameters for the process equipment, wherein the circuit executes the program code to perform:
   a data acquisition unit, obtaining a plurality sets of executed values of a plurality of operating parameters and a target parameter;
   an adaptive adjustment unit, including:
      a parameter space transformer, performing a space transformation on a parameter space of the operating parameters according to the plurality sets of the executed values to obtain a transformed parameter space having an orthogonal relationship between a plurality of transformed components; and
      a search range definer, defining a parameter search range in the transformed parameter space according to the plurality sets of the executed values; and
   an optimization search unit, searching out a set of recommended values of the operating parameters by taking the parameter search range as a limiting condition and taking optimizing the target parameter as a target; and
   transmitting the set of recommended values of the operating parameters to the process equipment to obtain the target parameter.

2. The system for parameter optimization with adaptive search space according to claim 1, wherein the adaptive adjustment unit further comprises:

a parameter filter, configured to filter the operating parameters according to a group relationship of the operating parameters for performing the space transformation by the parameter space transformer.

3. The system for parameter optimization with adaptive search space according to claim 2, wherein the operating parameters are classified into a plurality of groups according to interaction effect of the operating parameters.

4. The system for parameter optimization with adaptive search space according to claim 3, wherein the parameter filter filters the groups according to correlations of the groups to the target parameter.

5. The system for parameter optimization with adaptive search space according to claim 2, wherein the parameter filter filters the operating parameters via a Group-Lasso Regularization algorithm, a Sparse Group Lasso algorithm, a Bayesian Group Lasso algorithm, a Composite Absolute Penalty algorithm or a Group Least Angle Regression Selection algorithm.

6. The system for parameter optimization with adaptive search space according to claim 1, wherein the parameter space transformer performs the space transformation to reduce interaction effect of the operating parameters and increase recognition of the operating parameters to the target parameter.

7. The system for parameter optimization with adaptive search space according to claim 1, wherein the parameter space transformer performs the space transformation via a Partial Least Squares regression algorithm or a Principal Component Analysis (PCA) algorithm.

8. The system for parameter optimization with adaptive search space according to claim 1, wherein the search range definer obtains a Gaussian process model according to the plurality sets of the executed values, reserves an accurate range according to the Gaussian process model, and defines the parameter search range in the accurate range according to an Expected Improvement (EI) function.

9. The system for parameter optimization with adaptive search space according to claim 1, wherein the optimization search unit searches out the set of recommended values via a Constrained Bayesian optimization algorithm.

10. A method for parameter optimization with adaptive search space, wherein a circuit is connected with a process equipment, a storage device storing program code is executed by the circuit to optimize a plurality of operating parameters for the process equipment, and the circuit executes the program code to perform the method for parameter optimization with adaptive search space comprising:
    obtaining a plurality sets of executed values of a plurality of operating parameters and a target parameter;
    performing a space transformation on a parameter space of the operating parameters according to the plurality sets of the executed values to obtain a transformed parameter space having an orthogonal relationship between a plurality of transformed components;
    defining a parameter search range in the transformed parameter space according to the plurality sets of the executed values; and
    searching out a set of recommended values of the operating parameters by taking the parameter search range as a limiting condition and taking optimizing the target parameter as a target; and
    transmitting the set of recommended values of the operating parameters to the process equipment to obtain the target parameter.

11. The method for parameter optimization with adaptive search space according to claim 10, further comprising:
    filtering the operating parameters according to a group relationship of the operating parameters for performing the space transformation.

12. The method for parameter optimization with adaptive search space according to claim 11, wherein in the step of filtering the operating parameters, the operating parameters are classified into a plurality of groups according to interaction effect of the operating parameters.

13. The method for parameter optimization with adaptive search space according to claim 12, wherein in the step of filtering the operating parameters, the groups are filtered according to correlations of the groups to the target parameter.

14. The method for parameter optimization with adaptive search space according to claim 11, the operating parameters are filtered via a Group-Lasso Regularization algorithm, a Sparse Group Lasso algorithm, a Bayesian Group Lasso algorithm, a Composite Absolute Penalty algorithm or a Group Least Angle Regression Selection algorithm.

15. The method for parameter optimization with adaptive search space according to claim 10, wherein in the step of performing the space transformation on the parameter space of the operating parameters, the space transformation is performed to reduce interaction effect of the operating parameters and increase recognition of the operating parameters to the target parameter.

16. The method for parameter optimization with adaptive search space according to claim 10, wherein in the step of performing the space transformation on the parameter space of the operating parameters, the space transformation is performed via a Partial Least Squares regression algorithm or a Principal Component Analysis (PCA) algorithm.

17. The method for parameter optimization with adaptive search space according to claim 10, wherein in the step of defining the parameter search range in the transformed parameter space, a Gaussian process model is obtained according to the plurality sets of the executed values, an accurate range is reserved according to the Gaussian process model, and the parameter search range in the accurate range is defined according to an Expected Improvement (EI) function.

18. The method for parameter optimization with adaptive search space according to claim 10, wherein in the step of searching out the set of recommended values of the operating parameters, the set of recommended values is searched out via a Constrained Bayesian optimization algorithm.

* * * * *